(12) United States Patent
Arhab et al.

(10) Patent No.: US 9,726,232 B2
(45) Date of Patent: Aug. 8, 2017

(54) TRANSMISSION SYSTEM HAVING A DOUBLE WET CLUTCH MECHANISM

(71) Applicant: VALEO EMBRAYAGES, Amiens (FR)

(72) Inventors: Rabah Arhab, Saint-Brice-sous-Foret (FR); Herve Ribot, Peronne (FR); Laurent Caumartin, Beauquesne (FR)

(73) Assignee: Valeo Embrayages (FR)

( * ) Notice: Subject to any disclaimer, the term of this patent is extended or adjusted under 35 U.S.C. 154(b) by 0 days.

(21) Appl. No.: 14/872,928

(22) Filed: Oct. 1, 2015

(65) Prior Publication Data

US 2016/0102717 A1 Apr. 14, 2016

(30) Foreign Application Priority Data

Oct. 9, 2014 (FR) ..................... 14 59678

(51) Int. Cl.
| | | |
|---|---|---|
| F16D 25/10 | (2006.01) | |
| F16D 13/38 | (2006.01) | |
| F16D 21/00 | (2006.01) | |
| F16D 1/033 | (2006.01) | |
| F16D 25/12 | (2006.01) | |
| F16D 21/06 | (2006.01) | |
| F16D 25/0638 | (2006.01) | |
| F16D 13/72 | (2006.01) | |

(52) U.S. Cl.
CPC ............ F16D 25/10 (2013.01); F16D 1/033 (2013.01); F16D 13/385 (2013.01); F16D 21/00 (2013.01); F16D 21/06 (2013.01); F16D 25/0638 (2013.01); F16D 25/123 (2013.01); F16D 13/72 (2013.01); *F16D 2021/0661* (2013.01); *F16D 2021/0692* (2013.01); *F16D 2300/0214* (2013.01); *F16D 2300/26* (2013.01); *Y02T 10/76* (2013.01)

(58) Field of Classification Search
CPC ............... F16D 25/10; F16D 2300/214; F16D 2021/0692
See application file for complete search history.

(56) References Cited

U.S. PATENT DOCUMENTS 4,964,504 A * 10/1990 Friedmann .......... F16D 25/0638
192/48.4
5,927,820 A * 7/1999 Vignotto ............. B60B 27/0005
301/105.1

(Continued)

FOREIGN PATENT DOCUMENTS

| EP | 1174631 A2 | 1/2002 |
|---|---|---|
| EP | 1686277 A1 | 8/2006 |
| WO | 2010133198 A1 | 11/2010 |

*Primary Examiner* — Mark Manley
(74) *Attorney, Agent, or Firm* — Berenato & White, LLC

(57) ABSTRACT

A transmission system (10), especially for a motor vehicle, having around an axis (O) at least an input shell (12) that is rotationally connected to a driving shaft and to a drive web (18) in order to rotationally connect said input shell (12) to a double wet clutch mechanism (20) that, having at least a first clutch (E1) and a second clutch (E2) respectively of the multiple-disc type, is controlled to selectively couple said driving shaft to a first driven shaft (A1) and to a second driven shaft (A2), wherein the input shell (12) and the drive web (18) are rotationally connected by connecting means (24), which are constituted in particular by rivets (25), with zero angular clearance.

16 Claims, 7 Drawing Sheets

(56) References Cited

U.S. PATENT DOCUMENTS

| | | | |
|---|---|---|---|
| 7,823,711 B2* | 11/2010 | Uhler | F16D 13/52 |
| | | | 192/110 B |
| 8,235,192 B2* | 8/2012 | Arnold | F16D 13/683 |
| | | | 192/48.619 |
| 2004/0079606 A1* | 4/2004 | Orlamunder | F16D 13/385 |
| | | | 192/48.8 |
| 2004/0206599 A1* | 10/2004 | Hegerath | F16D 21/06 |
| | | | 192/48.611 |
| 2005/0039998 A1* | 2/2005 | Zuehl | F16H 45/02 |
| | | | 192/3.29 |
| 2008/0087517 A1* | 4/2008 | Mori | F16D 21/06 |
| | | | 192/48.614 |
| 2012/0085615 A1 | 4/2012 | Noehl et al. | |
| 2013/0153355 A1* | 6/2013 | Kummer | F16D 25/0638 |
| | | | 192/48.1 |
| 2014/0209424 A1 | 7/2014 | Kim | |

* cited by examiner

TRANSMISSION SYSTEM HAVING A DOUBLE WET CLUTCH MECHANISM

CROSS-REFERENCE TO RELATED APPLICATIONS AND CLAIM TO PRIORITY

This application claims priority to Patent Application No. 1459678 filed Oct. 9, 2014 in France, the disclosure of which is incorporated herein by reference and to which priority is claimed.

FIELD OF THE INVENTION

The present invention relates to a transmission system having a double wet clutch mechanism.

The present invention relates more particularly to a transmission system, especially for a motor vehicle, having around an axis at least an input shell that is rotationally connected to a driving shaft and to a drive web in order to rotationally connect said input shell to a double wet clutch mechanism that, having at least a first clutch and a second clutch respectively of the multiple-disc type, is controlled to selectively couple said driving shaft to a first driven shaft and to a second driven shaft.

BACKGROUND OF THE INVENTION

Transmission systems of this kind having a double clutch mechanism are known from the existing art.

A distinction is made in particular between two double clutch mechanism designs: on the one hand so-called double "dry" clutch mechanisms, and on the other hand so-called double "wet" clutch mechanisms.

The present invention relates more particularly to a double wet clutch.

In the case of a double wet clutch mechanism, the clutches are generally of the multiple-disc type and the friction linings of the discs are kept constantly wet with oil.

A double clutch mechanism has a first clutch, arranged for example on the gearbox side, that serves both for starting and for engagement of the odd-numbered ratios, and a second clutch, arranged for example on the engine side, that handles the even-numbered ratios and the reverse gear.

The first clutch and the second clutch alternatively transmit input power (torque and speed) from the driving shaft, which is rotationally connected to the engine, to one of the two driven shafts that are connected to the gearbox and are generally coaxial.

For improved safety, the first clutch and the second clutch of the mechanism are respectively disengaged when at rest, i.e. are "normally open," and are actively closed by hydraulic actuating means of a control device that is associated with the double clutch mechanism.

The increasing attention being paid to double clutch mechanisms has to do in particular with the convenience and performance obtained, as well as continuous acceleration during gear changes with no interruption in torque.

Transmission systems having such a double clutch mechanism also provide a benefit in terms of consumption and $CO_2$ emission, especially as compared with a traditional automatic gearbox.

Known transmission systems having a double wet clutch mechanism are nevertheless not entirely satisfactory, especially for certain applications.

In certain applications, especially but not exclusively for industrial vehicles such as trucks and utility vehicles, what is desired is reliable transmission of large torques with a transmission system that is still radially compact, for example in order to allow installation between the engine and gearbox of the vehicle.

The engine torque to be transmitted by transmission systems has been steadily growing for several years, reaching values on the order of 4000 Nm. Known architectures for transmission systems having a double wet clutch mechanism do not allow these torque values to be transmitted and/or do not offer satisfactory reliability.

SUMMARY OF THE INVENTION

The object of the present invention is in particular to propose a transmission system, having a double wet clutch mechanism, capable of overcoming at least some of certain disadvantages of the existing art.

To this end, the invention proposes a transmission system, especially for a motor vehicle, having around an axis at least an input shell that is rotationally connected to a driving shaft and to a drive web in order to rotationally connect said input shell to a double wet clutch mechanism that, having at least a first clutch and a second clutch respectively of the multiple-disc type, is controlled to selectively couple said driving shaft to a first driven shaft and to a second driven shaft, wherein the input shell and the drive web are rotationally connected by connecting means, with zero angular clearance.

Thanks to the zero-angular-clearance rotational connecting means according to the invention, transmission of a large torque between the input shell and the drive web is achieved with satisfactory reliability. The absence of angular clearance improves the torsional rigidity of the connection between the input shell and the drive web. The absence of angular clearance also eliminates the risk of weakening the connection. That risk exists in particular when the connection is made by the interlocking of tooth sets arranged between the input shell and the drive web.

Preferably the input shell and the drive web are rotationally connected by connecting means, with zero axial clearance. The absence of axial clearance eliminates the risk of weakening the connection.

Advantageously, said means for rotationally connecting the input shell and the drive web with zero angular clearance are implemented by riveting, by welding, or by crimping.

According to other characteristics of the invention:
said means for rotationally connecting the input shell and the drive web with zero angular clearance are implemented by riveting;
said connecting means, implemented by riveting, have inserted rivets;
the rivets are distributed circumferentially in a regular manner around the rotation axis of the transmission system;
said means for rotationally connecting the input shell and the drive web with zero angular clearance are implemented by crimping, in particular hot crimping;
said means for rotationally connecting the input shell and the drive web with zero angular clearance are implemented by welding;
said connecting means are implemented by a circumferentially continuous weld bead;
said connecting means are implemented by a circumferentially discontinuous weld bead, such as an added-material weld;
said connecting means are implemented by a weld with no added material, such as a spot resistance weld;

the input shell has at least one radially oriented connecting portion that is rotationally connected by said connecting means to a radially oriented connecting portion of the drive web;

at least one of said radially oriented connecting portions is constituted by a circumferentially continuous rim;

the input shell has, at the free front end of an axially oriented radially outer portion, a rim forming said circumferentially continuous and radially oriented connecting portion of the input shell, and/or the drive web has, at the free rear end of an axially oriented radially outer portion, a rim forming said circumferentially continuous and radially oriented portion of the drive web;

at least one of said radially oriented circumferentially discontinuous connecting portions is constituted by radial tabs;

the input shell has, at the free front end of an axially oriented radially outer portion, radial tabs forming said circumferentially continuous connecting portion of the input shell, and/or the drive web has, at the free rear end of an axially oriented radially outer portion, radial tabs forming said circumferentially continuous connecting portion of the drive web;

said at least one connecting portion of the input shell has a radial face and said at least one connecting portion of the drive web has a radial face, said radial faces being attached axially to one another in at least regions in which said connecting portions are axially connected by said connecting means;

the system has oil drainage means arranged in at least one radially outer portion of the input shell and/or in at least one radially outer portion of the drive web, to allow oil drainage radially outward;

said oil drainage means are distributed circumferentially in a regular manner and/or are paired symmetrically with respect to the axis;

said oil drainage means have at least radial holes implemented in an axially oriented radially outer portion of the drive web and/or in an axially oriented radially outer portion of the input shell;

said oil drainage means have at least one radial oil drainage passage configured circumferentially between the connecting portions of the input shell and of the drive web rotationally connected by said connecting means;

said at least one radial oil drainage passage is constituted by an axial indentation implemented in at least one unconnected region of said at least one connecting portion of the input shell and/or in at least one unconnected region of said at least one connecting portion of the drive web;

said at least one radial oil drainage passage is constituted by an axial clearance between an edge of the input shell and the drive web, said circumferentially discontinuous axial clearance being located between all or some of the regions of said connecting portions of the input shell and of the drive web rotationally connected by said connecting means;

the input shell has an axially oriented radially outer portion that is tilted with respect to the axial orientation in order to guide oil toward the drainage means, and/or the drive web has an axially oriented radially outer portion that is tilted with respect to the axial orientation in order to guide oil toward the drainage means.

BRIEF DESCRIPTION OF THE DRAWINGS

Other characteristics and advantages of the invention will emerge upon reading the detailed description that will follow, which will be understood upon reference to the attached drawings in which.

DETAILED DESCRIPTION OF THE PREFERRED EMBODIMENT(S)

Figure 1:
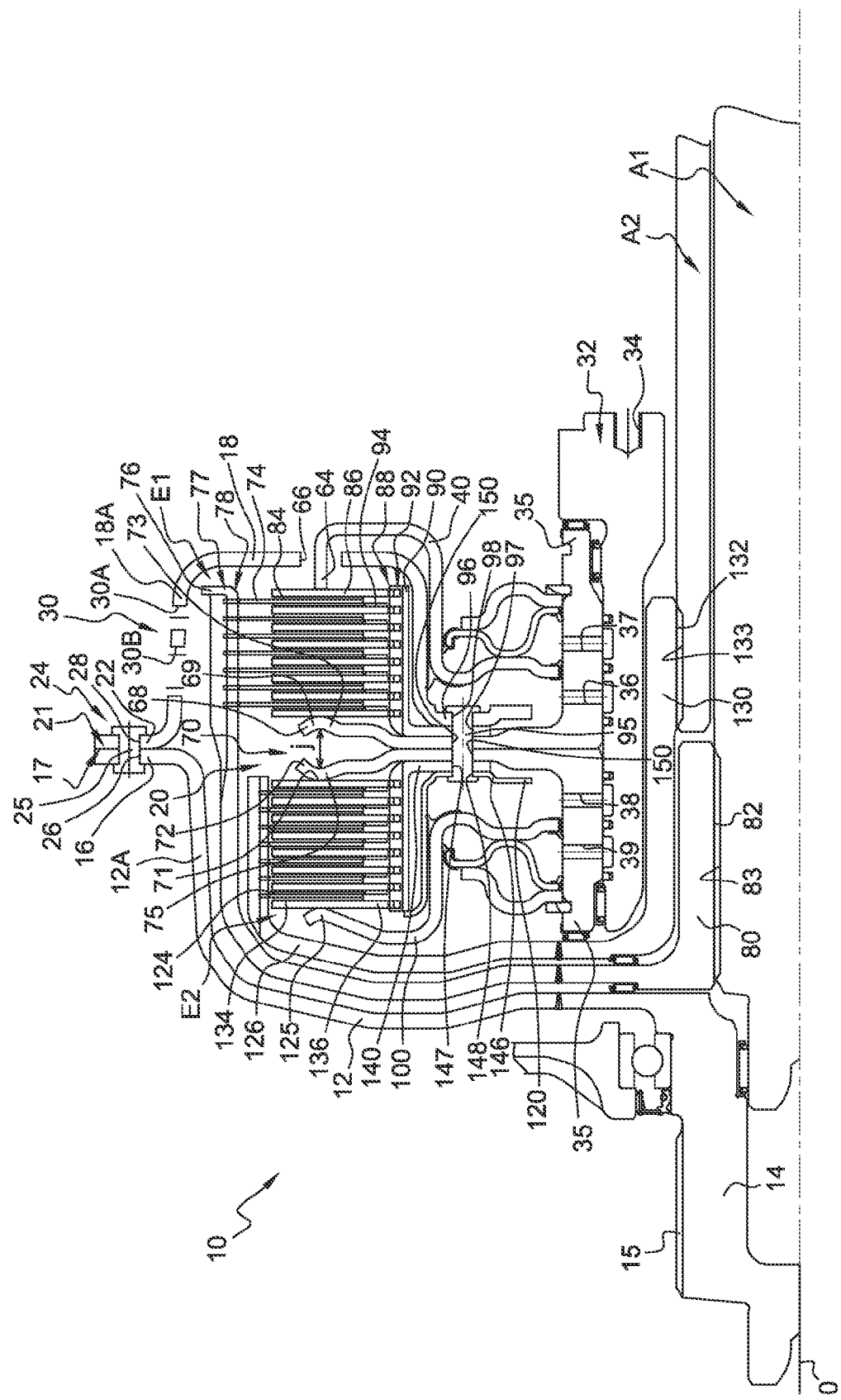
FIG. 1 is an axial half section view that depicts a transmission system having a double wet clutch mechanism and that illustrates a first embodiment of the invention in which the connecting means of the input shell and of the drive web are implemented by riveting, the rivets connecting a radial rim of the input shell and a radial rim of the drive web with zero axial clearance and rotationally with zero angular clearance.

In the description below and in the claims, the terms "front" or "rear" will be used, in non-limiting fashion and in order to facilitate understanding, in accordance with the direction determined with respect to an axial orientation determined by principal rotation axis O of the transmission system, as well as the terms "internal/inner" or "external/outer" with respect to axis O and in accordance with a radial orientation orthogonal to said axial orientation.

FIGS. 1 to 4 depict a first embodiment of a transmission system 10, especially for a motor vehicle, having a principal rotation axis O.

Transmission system 10 has, around axis O, at least one input element that is rotationally connected to a driving shaft (not depicted).

The input element of system 10 preferably has at least an input shell 12 that is rotationally connected to an input hub 14.

Input shell 12, here having an overall L-shape, has a radially oriented portion and an axially oriented radially outer portion 12A.

Hub 14 has a radially oriented portion and an axially oriented portion, hub 14 being arranged radially internally with respect to shell 12.

The axially oriented portion of hub 14 extends inside the radial portion, axially rearward, in a direction corresponding to that of the engine.

Hub 14 has splines 15, configured in an outer cylindrical surface of the axial portion, for rotational connection of the input element, constituted by at least shell 12 and hub 14, to the driving shaft.

The internal end of the radial portion of shell 12 and the external end of the radial portion of input hub 14 are in one piece, preferably fastened together by welding.

As a variant, the internal end of the radial portion of input shell 12 and the external end of the radial portion of input hub 14 are fastened together by riveting.

Input hub 14 is, for example, rotationally connected by means of splines 15 to the output of a damping device or damper (such as a dual mass flywheel), the input of which is connected, in particular by means of an engine flywheel, to the driving shaft constituted by a crankshaft that is caused to rotate by an engine that is part of the motor vehicle.

Input shell 12 is caused to rotate by the engine by means of input hub 14.

Axially oriented radially outer portion 12A of input shell 12 has, at its free front axial end, at least one radially oriented connecting portion 16.

Said at least one connecting portion 16 of input shell 12 has a radial face 17 oriented axially frontward.

Figure 3:
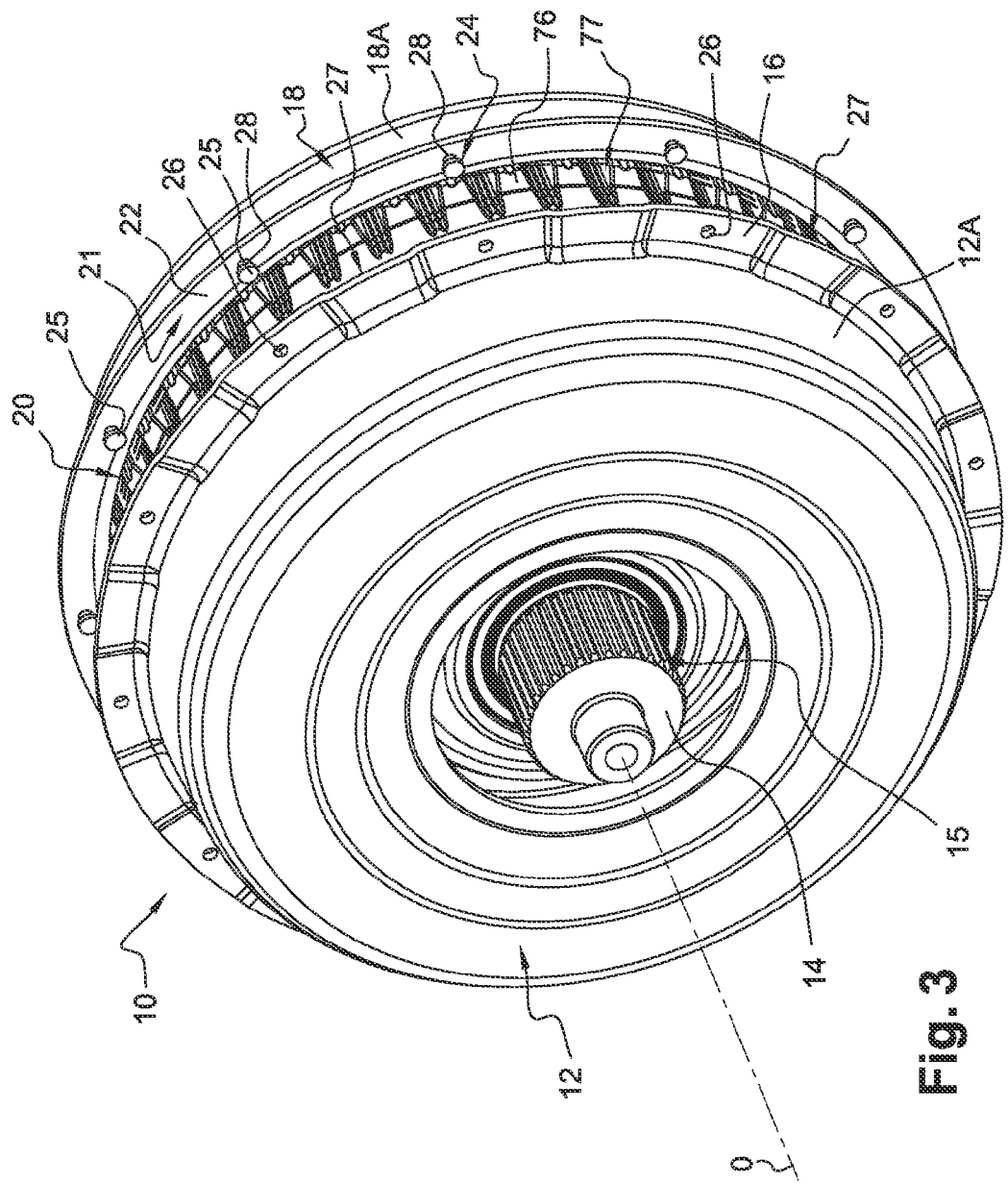
FIGS. 3 and 4 are perspective views that depict the transmission system according to the first embodiment and that respectively illustrate, by means of an axial exploded view, the circumferentially continuous rims of the input shell and of the drive web which are rotationally connected with zero angular clearance by riveting, and the oil drainage means having on the one hand said radial oil circulation passages produced by stamping of the radial rim of the input shell, and on the other hand radial holes implemented in the axially oriented radially outer portion of the drive web.
Figure 4:
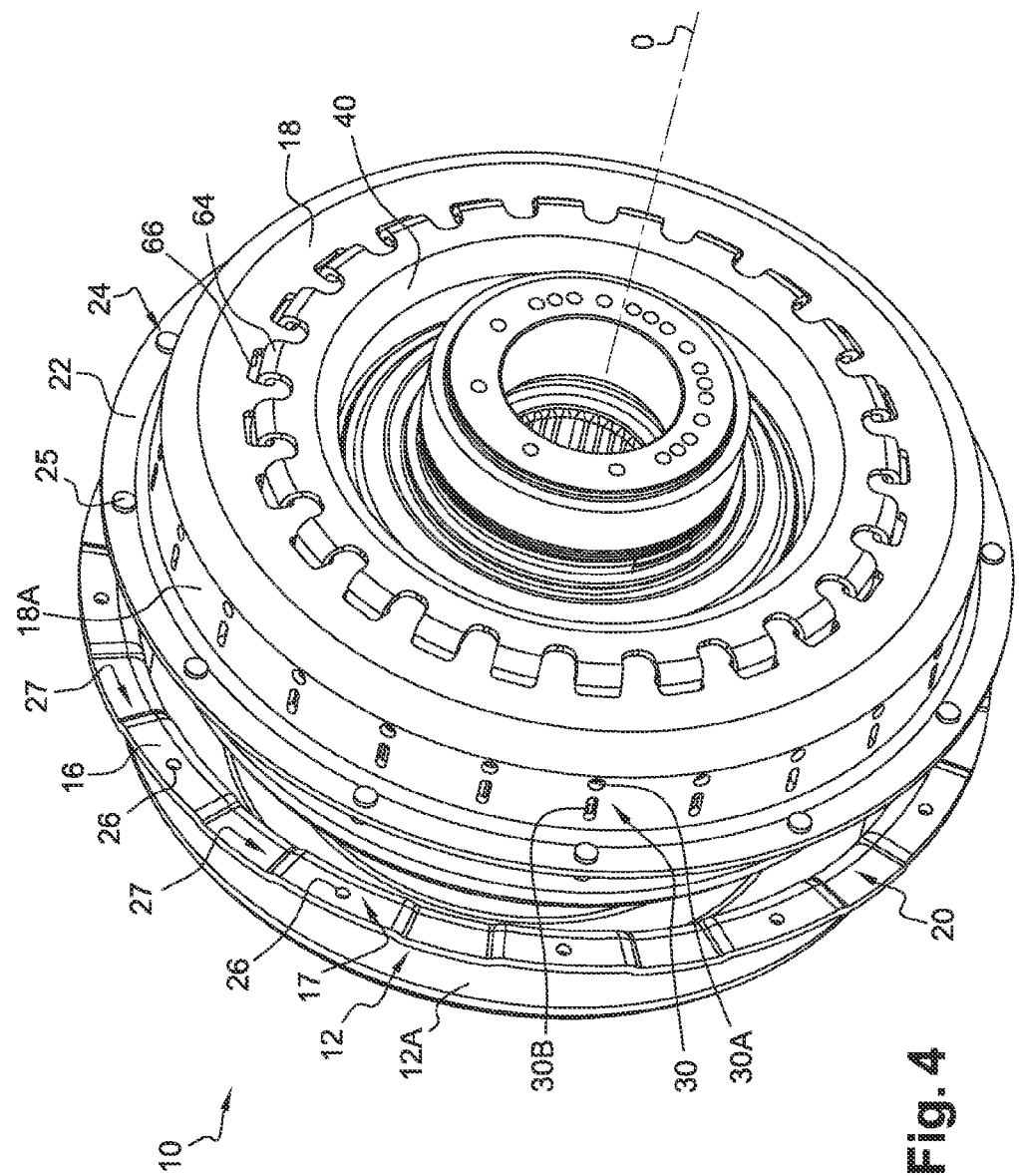

In this first embodiment and as illustrated in particular by FIGS. 3 and 4, said at least one radially oriented connecting portion 16 of input shell 12 is constituted by a circumferentially continuous rim.

As a variant, said at least one radially oriented connecting portion 16 of input shell 12 is circumferentially discontinuous.

Input shell 12 is rotationally connected to a drive web 18, which drive web 18 rotationally connects said input shell 12 to a double wet clutch mechanism 20.

Drive web 18 has a radially oriented portion that is connected to mechanism 20, and an axially oriented radially outer portion 18A.

Axially oriented radially outer portion 18A of drive web 18 has, at its free rear axial end, at least one radially oriented connecting portion 22.

Said at least one connecting portion 22 of drive web 18 has a radial face 21 oriented axially rearward.

In this first embodiment and as illustrated in particular in FIGS. 3 and 4, said at least one radially oriented connecting portion 22 of drive web 18 is constituted by a circumferentially continuous rim.

As a variant, said at least one radially oriented connecting portion 22 of drive web 18 is circumferentially discontinuous.

Input shell 12 has, at the free front end of its axially oriented radially outer portion 12A, a rim 16 forming said circumferentially continuous and radially oriented connecting portion of input shell 12; and drive web 18 has, at the free rear end of its axially oriented radially outer portion 18A, a rim 22 forming said circumferentially continuous and radially oriented connecting portion of drive web 18.

As a variant, input shell 12 has, at the free front end of its axially oriented radially outer portion 12A, a rim 16 constituting said circumferentially continuous and radially oriented connecting portion of input shell 12; or drive web 18 has, at the free rear end of its axially oriented radially outer portion 18A, a rim 22 constituting said circumferentially continuous and radially oriented connecting portion of drive web 18.

Thus at least one of said radially oriented connecting portions 16, 22 is constituted by a circumferentially continuous rim.

Input shell 12 and drive web 18 are rotationally connected by connecting means 24, with zero angular clearance.

Advantageously, a zero-angular-clearance rotational connection allows transmission of a large torque, for example 4000 Nm, while the resulting connecting means exhibit the required reliability.

Preferably, input shell 12 and drive web 18 are rotationally connected by said connecting means 24, with zero axial clearance.

Preferably, said zero-angular-clearance rotational connection means 24 of input shell 12 and of drive web 18 are implemented by riveting.

In variants that are not depicted, connecting modes other than riveting are capable of being utilized to rotationally connect input shell 12 and drive web 18 with zero angular clearance and zero axial clearance.

As a variant, said zero-angular-clearance rotational connecting means 24 of input shell 12 and of drive web 18 are implemented by welding.

Said connecting means 24 are constituted, for example, by a weld bead, which weld bead can be circumferentially continuous or discontinuous, in particular depending on connecting parts 16 and 22 of input shell 12 and of drive web 18, one and/or the other of which can also be circumferentially continuous or discontinuous.

When said connecting means 24 are implemented in the form of a weld bead, in particular a circumferentially discontinuous one, said weld bead is then obtained, for example, by means of an added-material weld.

As a variant, said connecting means 24 are implemented in the form of a resistance spot weld. In this method, connecting portions 16 and 22 of input shell 12 and of drive web 18 are superimposed and are clamped locally between two electrodes. A welding current passes through the assemblage thus formed, causing localized melting of the two parts 16 and 22 in the area in which the two electrodes are positioned. This welding method does not require any added material. In this example the weld is circumferentially discontinuous.

As a variant, said zero-angular-clearance rotational connecting means 24 of input shell 12 and of drive web 18 are implemented by crimping.

The crimping is, for example, a "hot" crimping produced in particular by locally heating the connecting portions of input shell 12 and of drive web 18 that are to be crimped together, then applying onto at least one of said parts a load suitable for deforming the material and for rotationally connecting said parts with zero angular clearance and with zero axial clearance.

In this first embodiment, connecting means 24 of input shell 12 and of drive web 18 preferably being implemented by riveting, said connecting means 24 are constituted at least by rivets 25.

For axial passage of rivets 25, rim 16 of input shell 12 has a series of axial holes 26, and rim 22 of drive web 18 has a series of axial holes 28.

During the riveting operation, rivet 25 expands at the level of axial holes 26, 28 in response to the riveting force applied onto its ends.

Rivets 25 rotationally connect, with zero angular clearance and zero axial clearance, rims 16 and 22 that respectively constitute said radially oriented connecting portions of input shell 12 and of drive web 18.

Preferably, rivets 25 and holes 26 and 28 are distributed circumferentially in a regular manner around rotation axis O.

In at least the connected regions, i.e. where said connecting portions 16 and 22 of input shell 12 and of drive web 18 are axially connected by said rivets 25 that constitute connecting means 24, said radial faces 17 and 21 of the connecting portions are axially attached to one another.

In a double wet clutch mechanism 20, oil circulates radially from inside to outside and oil drains through axially oriented radially outer parts 12A and 18A of input shell 12 and of drive web 18 so that it does not accumulate or stagnate inside the inner volume, delimited by shell 12 and web 18, in which said mechanism 20 is received.

Advantageously, system 10 has oil drainage means that are arranged in at least one radially outer portion of input shell 12 and/or in at least one radially outer portion of drive web 18, in order to allow oil to drain.

The oil drainage means of system 10 allow oil to circulate radially outward, outside the internal volume comprising said double wet clutch mechanism 20, in particular through radially outer portions 12A and 18A, in particular in order to ensure oil return generally toward a pan (not depicted).

Preferably said oil drainage means are distributed circumferentially in a regular manner and/or are paired symmetrically with respect to rotation axis O.

Advantageously, said oil drainage means have at least radial holes 30 implemented in axially oriented radially outer portion 18A of drive web 18 and/or in axially oriented radially outer portion 12A of input shell 12.

Figure 2:
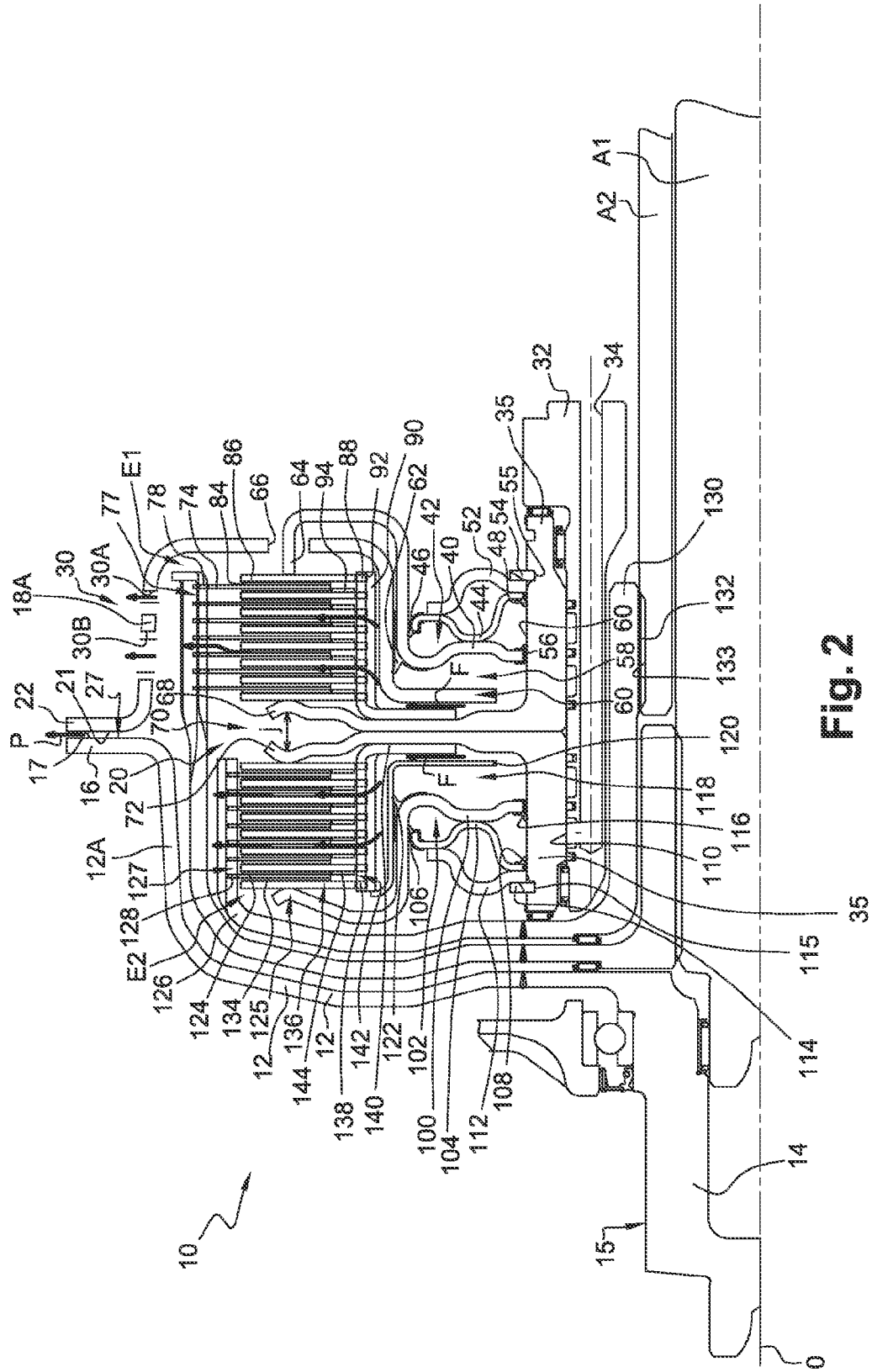
FIG. 2 is an axial half section view, shifted angularly with respect to that of FIG. 1, that depicts the transmission system according to the first embodiment and that illustrates in particular one of the radial oil circulation passages that exists between two consecutive rivets and is constituted by an axial indentation of the radial face of the rim of the input shell.

In this first embodiment and as illustrated in particular in FIGS. 2 and 4, said oil drainage means have at least radial holes 30 implemented in axially oriented radially outer portion 18A of drive web 18.

As a variant that is not depicted, said oil drainage means can also have radial holes implemented in axially oriented radially outer portion 12A of input shell 12. According to another embodiment of the invention, said oil drainage means have only radial holes implemented in axially oriented radially outer portion 12A of input shell 12.

Preferably said radial holes 30 implemented at least in axially oriented radially outer portion 18A of drive web 18 have at least a first series of holes 30A and a second series of holes 30B.

The first series of holes 30A is located axially to the front of the second series of holes 30B. Holes 30A are globally axially aligned with holes 30B in such a way that said holes 30A and 30B are axially alongside one another.

As a variant, holes 30A of the first series and holes 30B of the second series are offset angularly with respect to one another.

In a non-limiting manner, holes 30A of the first series are globally circular in section, and holes 30B of the second series are oblong in shape with their larger dimension along in the axial direction.

Advantageously, radial holes 30A of the first series and/or radial holes 30B of the second series are distributed circumferentially in a regular manner around rotation axis O.

Preferably said oil drainage means have at least one radial oil drainage passage P configured circumferentially between connecting portions 16 and 22 of input shell 12 and of drive web 18 that are connected with zero axial clearance and rotationally with zero angular clearance by rivets 25 constituting said connecting means 24.

One of the radial oil drainage passages P is schematically depicted in FIG. 2 by an arrow.

Preferably said oil drainage means have radial holes implemented in one and/or the other of axially oriented radially outer portions 12A and 18A of input shell 12 and of drive web 18, and radial oil drainage passages P configured between connecting portions 16 and 22 of input shell 12 and of drive web 18.

As a variant that is not depicted, said oil drainage means are constituted by radial holes implemented in at least one of axially oriented radially outer portions 12A and 18A of input shell 12 and of drive web 18, or radial oil drainage passages P configured between connecting portions 16 and 22 of input shell 12 and of drive web 18.

The presence of radial oil drainage passages P between rims 16 and 22 of input shell 12 and of drive web 18 can allow a reduction in the number of radial holes when said oil drainage means are constituted by a combination of holes and said passages P.

Advantageously, the presence of radial oil drainage passages P allows a reduction, for a given overall oil passage cross section, in the total number of holes drilled radially into one and/or the other of said axially oriented radially outer portions 12A and 18A of input shell 12 and of drive web 18, thereby reducing the associated drilling costs for fabricating transmission system 10. The reduction in the total number of radially drilled holes has the advantage of improving the mechanical strength and torsional rigidity of input shell 12 or of drive web 18.

Said at least one radial oil drainage passage P is constituted by an axial indentation 27 implemented in at least one region, not connected by connecting means 24, of said at least one connecting portion 16 of input shell 12 and/or in at least one region, not connected by connecting means 24, of said at least one connecting portion 22 of drive web 18.

In the first embodiment depicted in FIGS. 1 to 4, rim 16 of input shell 12 has a series of indentations 27 implemented axially rearward in front face 17 of rim 16 in order to create axially an opening between the unconnected region of radial face 17 having indentation 27 and the axially opposite region of radial face 21 of rim 22 of drive web 18.

Indentations 27 for constituting radial oil circulation passages P between input shell 12 and drive web 18, at the regions not axially connected by rivets 25, are preferably implemented only in rim 16.

As a variant that is not depicted, rim 22 of drive web 18 has indentations implemented axially frontward in radial face 21 of said rim 22 in order to constitute said radial oil circulation passages P.

As a variant that is not depicted, rim 16 of input shell 12 and rim 22 of drive web 18 each have such axial indentations in order to constitute said radial oil circulation passages P, an indentation configured in one 16 of the rims being positioned angularly so as to be axially aligned with another indentation configured in the other 22 of the rims.

Radial oil circulation passages P constituted by axial stamping of one and/or the other of rims 16 and 22 are preferably distributed circumferentially in a regular manner.

Preferably an even number of radial oil circulation passages P constituted by axial stamping of one and/or the other of rims 16 and 22 are present, and are paired symmetrically with respect to rotation axis O.

As a variant, an odd number of radial oil circulation passages P constituted by axial stamping of one and/or the other of rims 16 and 22 are present.

Advantageously, input shell 12 has an axially oriented radially outer portion 12A that is tilted with respect to the axial orientation in order to guide oil radially outward toward the drainage means; and/or drive web 18 has an axially oriented radially outer portion that is tilted with respect to the axial orientation in order to guide oil radially outward toward the drainage means.

Axially oriented radially outer portion 12A of input shell 12 is tilted with respect to the axial orientation defined by axis O. The radius, centered on axis O, of axially oriented radially outer portion 12A increases axially from the rear frontward toward the end having said at least one radially oriented connecting portion 16.

Input shell 12 has an axially oriented radially outer portion 12A that is tilted at an acute angle whose value is determined as a function of the application and in particular of the oil drainage means.

Said acute angle is produced by the intersection of a mean line corresponding to said axially oriented radially outer portion 12A with an axially oriented line that extends, parallel to axis O, along a radius corresponding to an angled region joining said axially oriented radially outer portion 12A and the radially oriented radially inner portion of shell 12 that is integral with hub 14.

Axially oriented radially outer portion 18A of drive web 18 is tilted with respect to the axial orientation defined by axis O. The radius, centered on axis O, of said axially oriented radially outer portion 18A increases axially from the front rearward toward the end having said at least one radially oriented connecting portion 22.

Drive web 18 has an axially oriented radially outer portion 18A that is tilted at an acute angle whose value is determined as a function of the application and in particular of the oil drainage means.

Said acute angle is produced by the intersection of a mean line corresponding to said axially oriented radially outer portion 18A with an axially oriented line that extends, parallel to axis O, along a radius corresponding to an angled region joining said axially oriented radially outer portion 18A and the radially oriented radially inner portion of drive web 18 that is rotationally connected to mechanism 20.

Advantageously, the tilt of one and/or the other of said axially oriented radially outer portions 12A and 18A allows oil to be guided toward the oil drainage means, such as holes 30A, 30B and/or radial oil circulation passages P configured between rims 16 and 22, circumferentially between two successive rivets 25.

Double wet clutch mechanism 20 is controlled to selectively couple said driving shaft to a first driven shaft A1 and to a second driven shaft A2.

Preferably first driven shaft A1 and second driven shaft A2 are coaxial.

Double wet clutch mechanism 20 has at least a first clutch E1 and a second clutch E2 that are respectively of the multiple-disc type.

Input shell 12 and drive web 18 that are rotationally connected by their radially oriented connecting parts 16, 22 together delimit a volume inside which are received, in particular, said first clutch E1 and second clutch E2 of double wet clutch mechanism 20.

First driven shaft A1 is caused to rotate when said first clutch E1 is closed, and second driven shaft A2 is caused to rotate when said second clutch E2 is closed, said first and second driven shafts A1, A2 being respectively connected to a gearbox that is part of the motor vehicle.

In double wet clutch mechanism 20, first clutch E1 serves e.g. both for starting and for engaging the odd-numbered ratios, and second clutch E2 then handles the even-numbered ratios and the reverse gear; as a variant, the ratios handled by said first clutch E1 and second clutch E2 are interchanged.

First clutch E1 is arranged, for example, axially at the front on the gearbox side of input hub 14, and second clutch E2 is arranged, for example, axially at the rear on the engine side of input hub 14.

First clutch E1 and second clutch E2 alternatively transmit input power (torque and speed) from the driving shaft, which is received by input shell 12 of system 10, to one of the two driven shafts A1, A2 depending on the open or closed state of each of clutches E1 and E2.

Preferably first clutch E1 and second clutch E2 are in the open state, also called "normally open," and are actuated selectively during operation by a control device (not depicted) in order to transition from the open state to the closed state.

Double wet clutch mechanism 20 is generally controlled hydraulically by means of a pressurized fluid, such as oil.

In order to selectively control the change of state of first clutch E1 and of second clutch E2 of mechanism 20 of transmission system 10, the control device has at least one control shaft 32 having oil supply channels 34, for example four thereof as depicted in FIG. 1.

Mechanism 20 has at least one hub 35 having four radial orifices 36, 37, 38, 39 that are each connected to one of oil supply channels 34; the two orifices 36 and 37 are associated with control of first clutch E1 located axially at the front, and the other two orifices 38 and 39 are associated with control of second clutch E2 located axially at the rear.

First clutch E1 of the multiple-disc type has a piston 40 that is movable axially, here from the front rearward, between a disengaged position and an engaged position that correspond respectively to the open and closed states of first clutch E1.

Piston 40 is controlled as to displacement by means of a control chamber 42 delimited axially by a front face of an inner radial portion of piston 40 and by the rear radial face of a closure part 44.

Closure part 44 carries, at its outer radial end, sealing means 46 that interact with an inner face of an axial portion of piston 40 and, at its inner radial end, sealing means 48 that interact with an outer axial surface 50 of hub 35.

Closure part 44 is preferably associated with an abutment part 52 that is axially immobilized by a stop ring 54 mounted in a groove 55 of hub 35.

Advantageously, the axial forces associated with pressurization of control chamber 42 are absorbed by abutment part 52 and not by closure part 44 that carries sealing means 46 and 48.

Piston 40 has at its inner radial end sealing means 56 that interact with outer axial surface 50 of hub 35 when piston 40 is displaced axially between the disengaged and engaged positions by the pressurization of control chamber 32.

Closure part 44 of control chamber 42 of piston 40 has, between its two radial ends that carry sealing means 46 and 48, a convex region that interacts with the front radial face of the axially opposite piston 40.

The volume of control chamber 42 has an external portion and an internal portion, located radially on either side of said convex region of closure part 44.

Control chamber 42 is supplied with oil via orifice 37 that passes radially through hub 35, orifice 37 effecting communication between said control chamber 42 and one of oil supply channels 34.

Control chamber 42 of piston 40 of first clutch E1 is associated with a compensating chamber 58 delimited at least by a compensating piston 60.

Advantageously, drive web 18 constitutes compensating piston 60 of first clutch E1.

Drive web 18 thus has a dual function: on the one hand transmitting input power, and on the other hand as a compensating piston in the operation of first clutch E1.

More precisely, the function as compensating piston 60 of first clutch E1 is provided principally by the inner radial portion of said web 18.

As a variant, compensating piston 60 and drive web 18 are implemented in the form of two separate parts.

Compensating chamber 58 of first clutch E1 is delimited axially by the front radial face of compensating piston 60 constituted by the radially inner portion of drive web 18 and by the rear radial face of piston 40.

Compensating chamber 58 is supplied with oil via orifice 36 that hub 35 comprises.

Sealing of compensating chamber 58 is provided radially externally by sealing means 62 that are carried by piston 40 and that interact with the inner face of an axial portion of compensating piston 60 constituted by drive web 18.

Piston 40 of first clutch E1 extends radially and is disposed axially between control chamber 42 located axially at the front and compensating chamber 58 located axially at the rear.

Piston 40 of first clutch E1 has, at its external radial end, an actuating portion constituted by fingers 64 that extend axially rearward in order to act on a multiple-disc assemblage of first clutch E1.

Advantageously, drive web 18 has openings 66 for axial passage of said fingers 64 that constitute the actuating portion of piston 40 of clutch E1.

Piston 40 is controlled to cause axial clamping, in the engaged position, of said multiple-disc assemblage of first clutch E1 against reaction means 70.

In transmission system 10 depicted in FIGS. 1 and 2, first clutch E1 and second clutch E2 of said double wet clutch mechanism 20 are axially juxtaposed, first clutch E1 and second clutch E2 being arranged axially on either side of said reaction means 70.

Preferably said reaction means 70 have at least a first reaction element 68 and a second reaction element 72 that are associated respectively with first clutch E1 and second clutch E2 and are separated axially from one another by a clearance j.

Advantageously, first reaction element 68 and second reaction element 72 are axially separated from one another by an empty space corresponding to said clearance j.

Thanks to the axial clearance j, first reaction element 68 and second reaction element 72 are free to move axially independently of one another. The axial movement corresponds to flexure both of first reaction element 68 and of second reaction element 72 under the axial load transmitted by piston 40.

Advantageously, any risk of interaction between first reaction element 68 of first clutch E1 and second reaction element 72 of second clutch E2 during the operation of mechanism 20 is suppressed.

First reaction element 68 has a reaction face 69 oriented frontward toward first clutch E1, and second reaction element 72 has a reaction face 71 oriented rearward toward second clutch E2.

In the first embodiment depicted in FIGS. 1 to 4, first reaction element 68 and second reaction element 72 are implemented in the form of at least two different parts.

"At least two different parts" is understood to mean that first reaction element 68 and second reaction element 72 are parts that are independent of one another, at least until said elements 68, 72 are assembled within double wet clutch mechanism 20.

First reaction element 68 and second reaction element 72 are made, for example, of sheet metal.

As a variant that is not depicted, first reaction element 68 and second reaction element 72 are implemented as a single part in order to constitute an integral assemblage before assembly.

First reaction element 68 and second reaction element 72, implemented as one or as at least two parts, are rotationally connected to said at least one hub 35 of mechanism 20.

Said at least one hub 35 is preferably implemented in two portions, respectively a first hub associated with first reaction element 68 and a second hub associated with second reaction element 72.

As a variant that is not depicted, said at least one hub 35 is implemented as a single integral part.

First reaction element 68 and second reaction element 72 are preferably connected rotationally to said at least one hub 35, such as one common hub or the first and second hub, by welding.

As a variant, first reaction element 68 and second reaction element 72 are rotationally connected to said at least one hub 35, such as one common hub or the first and second hub, by riveting.

Advantageously, said at least one hub 35, as a single part or in two portions, is independent of said reaction elements 68 and 72 so that in particular it can be made of a material different from that utilized for reaction elements 68 and 72, in accordance with a selected production method.

As a variant that is not depicted, first reaction element 68 is implemented as a single part with the first hub of first clutch E1, and second reaction element 72 is implemented as a single part with said second hub of second clutch E2.

First reaction element 68 and second reaction element 72 have at least one abutment boss that is convex and extends axially toward the multiple-disc assemblage of that one of said first and second clutches E1, E2 with which the reaction element is associated.

First reaction element 68 has at least one abutment boss 73 whose front radial face constitutes said reaction face 69.

Second reaction element 72 has at least one abutment boss 75 whose rear radial face constitutes said reaction face 71.

Abutment bosses 73 and 75 are obtained, for example, by stamping of said reaction elements 68 and 72.

Preferably, said at least one abutment boss 73 of first reaction element 68 and said at least one axial abutment boss 75 of second reaction element 72 are located radially on the same radius with respect to axis O.

First reaction element 68 and second reaction element 72 are circumferentially continuous so as to form a disc.

As a variant that is not depicted, first reaction element 68 and second reaction element 72 have at least one circumferentially discontinuous outer radial portion that is constituted by a plurality of reaction arms.

According to this variant, reaction element 68, 72 preferably has a circumferentially continuous inner radial portion constituted by a ring, in particular for rotational connection of said reaction element to said at least one hub 35 that supports it.

In such a variant, the reaction arms extend radially outward from the annular inner radial portion, and each reaction arm is separated from the adjacent reaction arm by a radial slot.

The reaction arms according to this variant advantageously have abutment bosses 73 and 75 that respectively carry reaction faces 69 and 71.

Advantageously, first reaction element 68 and second reaction element 72, separated axially by the clearance j, have stiffening means in order to stiffen them and to limit axially the deflection of first reaction element 68 and of second reaction element 72.

Stiffening means of this kind are constituted, for example, by indentations implemented in first reaction element 68 and in second reaction element 72, radially below abutment bosses 73 and 75.

First clutch E1 and second clutch E2 of said double wet clutch mechanism 20 are actuated axially in opposite directions, i.e. axially from the front rearward against face 69 by piston 40 of first clutch E1, and axially from rear frontward against face 71 by that of second clutch E2.

The multiple-disc assemblage of first clutch E1 has at least friction discs 74 that are rotationally connected to said first driven shaft A1 by an external disc carrier 76. External disc carrier 76 constitutes the output element of first clutch E1.

External disc carrier 76 has at the external radial periphery an axial portion that is equipped with a tooth set 77 intended to interact with a complementary tooth set 78 that each friction disc 74 comprises at its external radial periphery.

External disc carrier 76 has radial holes, circumferentially distributed in said axial portion equipped with tooth set 77, and intended for the passage of oil introduced into the multiple-disc assemblage of first clutch E1.

External disc carrier 76 is rotationally connected to friction discs 74 by meshing, and to said first driven shaft A1 by a splined connection.

External disc carrier 76 has an output hub 80 that extends axially and has, radially internally, axial splines 82 that mesh with complementary splines 83 of first driven shaft A1.

External disc carrier 76 has an overall L-shape, the internal radial end of which, opposite tooth set 77, is integral with output hub 80.

External disc carrier 76 and output hub 80 are preferably fastened together by welding; as a variant, by riveting.

Friction discs 74 each have a friction lining 84 on their respective front and rear axially opposite radial faces.

The multiple-disc assemblage of first clutch E1 has flanges 86 that are equipped at their inner radial periphery with a tooth set 88 in order to rotationally connect them to an internal disc carrier 90.

Internal disc carrier 90 has at its outer radial end an axial portion having an outer tooth set 92 that, in complementary fashion, meshes with inner tooth set 88 of each of flanges 86 in order to rotationally connect them with zero clearance.

Internal disc carrier 90 has radial holes, distributed circumferentially in said axial portion equipped with tooth set 92, and intended for the passage of oil introduced into the multiple-disc assemblage of first clutch E1.

Friction discs 74 are individually interposed axially between two successive flanges 86. Each of the friction linings 84 of one of friction discs 74 interacts, in an engaged position, with one of the radial faces of flanges 86 arranged axially on either side (to the front and to the rear) of said friction disk 74.

The multiple-disc assemblage of first clutch E1 has, axially, a flange 86 at each of its ends, respectively a front flange 86 whose front radial face is intended to interact, in an engaged position, with fingers 64 that constitute the actuating portion of piston 40; and a rear flange 86 whose rear radial face is intended to interact with front face 69 of first reaction element 68.

First clutch E1 has resilient return means 94 for automatically returning piston 40 into a disengaged position corresponding to an open state of the clutch.

The resilient return means 94 for piston 40 are preferably constituted by resilient washers, such as spring washers of the "Onduflex™" type.

Resilient washers 94 are interposed axially between flanges 86 and are arranged radially inside friction discs 74, below friction linings 84. Each resilient washer 94 abuts axially against the rear radial face of a flange 86 and against the front radial face of another axially adjacent flange 86.

Resilient return means 94 impinge axially on flanges 86 and, by so doing, facilitate the release of friction discs 74 and the return of piston 40 toward the disengaged position.

As a variant that is not depicted, piston return means 94 of a clutch are constituted by at least one spring that is arranged, for example, radially between axis O and internal disc carrier 90 in order to automatically return piston 40 toward the disengaged position.

For direct transmission of input power, double wet clutch mechanism 20 has connecting means that, for first clutch E1, connect at least drive web 18, internal disc carrier 90, and reaction means 70 with zero axial clearance.

When drive web 18 and compensating piston 60 are, as a variant, implemented as two separate parts, the connecting means then likewise connect said compensating piston 60 to drive web 18, to internal disc carrier 90, and to reaction means 70 with zero axial clearance.

When compensating piston 60 of first clutch E1 is constituted by drive web 18, mechanism 20 has one less part; the advantages are, in particular, less cost and greater simplicity and axial compactness.

The connecting means are preferably implemented by riveting. As a variant that is not depicted, the connecting means are implemented by welding, in particular by transmission laser welding.

Drive web 18 has indentations 96 that are circumferentially distributed and project axially rearward with respect to the rear radial face of drive web 18 that constitutes compensating piston 60.

Indentations 96 each surround a hole 98 intended for axial passage of one of rivets 95 that constitute said connecting means.

In this first embodiment, rivets 95 that constitute the connecting means are advantageously common to first clutch E1 and to second clutch E2, which will now be described.

Second clutch E2 of double wet clutch mechanism 20 of transmission system 10 is similar in design to first clutch E1, second clutch E2 being of the multiple-disc type.

The detailed description provided above of first clutch E1 may advantageously be consulted as necessary for a description of second clutch E2.

Second clutch E2 has a piston 100 that is axially movable (here from the rear frontward) between a disengaged position and an engaged position corresponding respectively to the open and closed states of second clutch E2 of mechanism 20.

Piston 40 of first clutch E1 and piston 100 of second clutch E2 of said double wet clutch mechanism 20 move axially in opposite directions in order to transition, for example, from the disengaged position to the engaged position.

Piston 100 of second clutch E2 is controlled as to displacement by means of a control chamber 102 delimited axially by a rear face of an internal radial portion of piston 100 and by the front radial face of a closure part 104.

Control chamber 102 is selectively supplied with oil through orifice 38 that passes radially through hub 35 and is connected to one of supply channels 34 of control shaft 32.

Closure part 104 has, at its outer radial end, sealing means 106 that interact with an inner face of an axial portion of piston 100 and, at its inner radial end, sealing means 108 that interact with an outer surface 110 of hub 35.

Surface 110 associated with second clutch E2 is located axially to the rear with respect to reaction means 70 arranged between said clutches E1 and E2, i.e. axially opposite surface 50 associated with piston 40 of first clutch E1.

Closure part 104 is preferably associated with an abutment part 112 that is axially immobilized by a stop ring 114 mounted in a groove 115 of hub 35.

Piston 100 has, at its inner radial end, sealing means 116 that interact with outer surface 110 of hub 35 when piston 100 is displaced axially between the disengaged and engaged positions by the pressurization of control chamber 102.

Like closure part 44 for first clutch E1, closure part 104 is configured, globally between its radial ends that carry sealing means 106 and 108, to come into axial interaction with the rear radial face of piston 100.

Control chamber 102 is associated with a compensating chamber 118 delimited by at least one compensating piston 120.

As compared with compensating piston 60 of first clutch E1, which is constituted by drive web 18, compensating piston 120 of second clutch E2 is a separate part.

Compensating chamber 118 is delimited axially by the rear radial face of compensating piston 120 and by the front radial face of piston 100.

Sealing of compensating chamber 118 is provided radially externally by sealing means 122 that are carried by piston 100 and that interact with the inner face of an axial portion of compensating piston 120.

The inner radial portion of piston 100 extends radially, and it is disposed axially between control chamber 102 located axially to the rear and compensating chamber 118 located axially to the front.

Piston 100 of second clutch E2 has, at its external radial end, an actuating portion 125 constituted by a boss that extends axially frontward toward a multiple-disc assemblage of second clutch E2.

Actuating portion 125 of piston 100 of second clutch E2 is circumferentially continuous; as a variant, discontinuous.

The actuating portion constituted by fingers 64 of piston 40 of first clutch E1, and actuating portion 125 of piston 100 of second clutch E2 of said mechanism 20, are located radially on the same radius centered on axis O of system 10.

Piston 40 of first clutch E1 and piston 100 of second clutch E2 each apply a clamping force onto the multiple-disc assemblage associated with them, along the axial direction but in opposite directions; the reaction that occurs on faces 69 and 71, respectively of first reaction element 68 and of second reaction element 72 that constitute said reaction means 70, is likewise opposite.

The multiple-disc assemblage of second clutch E2 has friction disks 124 that are rotationally connected to second driven shaft A2 by an external disc carrier 126 that constitutes the output element of clutch E2.

External disc carrier 126 has at the external radial periphery an axial portion that is equipped with an inner tooth set 127 intended to interact with an outer tooth set 128 that each of friction discs 114 comprises.

External disc carrier 126 has radial holes, distributed circumferentially in said axial portion equipped with tooth set 127, and intended for the passage of oil introduced into the multiple-disc assemblage of second clutch E2.

External disc carrier 126 is rotationally connected by meshing to friction discs 124, and by a splined connection to said second driven shaft A2.

External disc carrier 126 has an output hub 130 that extends axially and that has, radially internally, splines 132 that mesh with complementary splines 133 of second driven shaft A2.

Said disc carrier 126 and output hub 130 are preferably fastened together by welding; as a variant, by riveting.

Friction discs 124 each have a friction lining 134 on their respectively front and rear axially opposite radial faces.

The multiple-disc assemblage of second clutch E2 has flanges 136 that are equipped at their inner radial periphery with a tooth set 138 in order to connect them rotationally to an internal disc carrier 140.

Internal disc carrier 140 has at its outer radial end an axial portion having an outer tooth set 142 that meshes with inner tooth set 138 of each of flanges 136 in order to rotationally connect them with zero clearance.

Internal disc carrier 140 has radial holes, distributed circumferentially in said axial portion equipped with tooth set 142, and intended for the passage of oil introduced into the multiple-disc assemblage of second clutch E2.

Friction discs 124 are individually interposed axially between two successive flanges 136.

Each of the friction linings 134 of one of friction discs 124 interacts, in an engaged position, with a radial face of one of the two flanges 136 arranged axially on either side.

The multiple-disc assemblage of second clutch E2 has, axially, a flange 136 at each of its ends, respectively a rear flange 136 whose rear radial face is intended to interact, in an engaged position, with actuating part 125 of piston 100; and a front flange 136 whose front radial face is intended to interact with rear face 71 of reaction element 72.

Second clutch E2 has resilient return means 144 for automatically returning piston 100 into a disengaged position corresponding to an open state of the clutch.

Preferably, and as for first clutch E1, resilient return means 144 for piston 100 are constituted by resilient waved spring locking washers, such as spring washers of the "Onduflex®" type.

For direct transmission of input power, double wet clutch mechanism 20 has connecting means that, for second clutch E2, connect at least compensating piston 120, internal disc carrier 140 of second clutch E2, and said reaction means 70 with zero axial clearance.

Advantageously, the connecting means of second clutch E2 are implemented by riveting.

Said connecting means of second clutch E2 are preferably constituted by rivets 95 that are shared with first clutch E1, so that said connecting means are constituted only by rivets 95.

As depicted in FIG. 1, the connecting means of double wet clutch mechanism 20 are arranged axially between piston 40 of first clutch E1 and piston 100 of second clutch E2.

The connecting means connect at least said drive web 18, internal disc carrier 90 of first clutch E1, internal disc carrier 140 of second clutch E2, and said reaction means 70 with zero axial clearance.

Rivets 95 that constitute the connecting means allow drive web 18 to be connected simultaneously both to first clutch E1 and to second clutch E2 of the mechanism, and allow direct transmission of the input power delivered to system 10 by the driving shaft.

The connecting means are preferably used to ensure fastening of compensating piston 60 of first clutch E1, constituted here by web 18, and of compensating piston 120 of second clutch E2.

Advantageously, said connecting means 95 also connect compensating piston 60 of first clutch E1 and compensating piston 120 of second clutch E2 of mechanism 20 with zero axial clearance.

Reaction means 70 are interposed axially between internal disc carrier 90 of first clutch E1 and internal disc carrier 140 of second clutch E2, for direct transmission of input power to mechanism 20.

Like drive web 18 that constitutes compensating piston 60 of first clutch E1, compensating piston 120 of second clutch E2 has indentations 146 that each surround a hole 148 for the passage of one of rivets 95 that constitute the connecting means.

The front head of each rivet 95 abuts axially against the front radial face of compensating piston 60, here drive web 18, or more precisely is received at the front in the receptacle constituted by indentation 96 around hole 88.

The front head of rivet 95 is advantageously encompassed axially in the thickness of drive web 18 that constitutes compensating piston 60 of first clutch E1.

Said drive web 18 that constitutes compensating piston 60 of first clutch E1 has a series of holes 98 for passage of the body of rivets 95.

Internal disc carrier 90 of first clutch E1 has, in its inner radial portion, a series of axial holes 87 for the passage of rivets 95.

Reaction means 70 have a series of axial holes 150 for the passage of rivets 95.

Disc carrier 140 of second clutch E2 has a series of holes 147 for the axial passage of rivets 95, and compensating piston 120 has a series of holes 148.

As depicted in section in FIG. 1, rivets 95 that constitute the connecting means axially interconnect drive web 18, internal disc carrier 90 of first clutch E1, reaction means 70 that are preferably constituted by first reaction element 68 and by second reaction element 72 respectively associated with first and second clutches E1 and E2, internal disc carrier 140 of second clutch E2, and compensating piston 120 of second clutch E2 with zero clearance.

When compensating piston 60, as a variant, is a separate part from drive web 18, compensating piston 60 is then advantageously likewise connected with zero axial clearance by rivets 95 in order to be kept in position.

Like the front head, the rear head of each rivet 95 abuts axially against the rear radial face of compensating piston 120; more precisely, it is received in the rear receptacle constituted by recess 146 around hole 148.

The rear head of rivet 95 is encompassed axially in the thickness of compensating piston 120 of second clutch E2.

The body of each rivet 95 passes axially, successively from the rear frontward, through hole 148 of compensating piston 120, hole 147 of internal disc carrier 140 of E2, hole 150 through first reaction element 68 and second reaction element 72 that constitute reaction means 70, hole 97 of internal disc carrier 90 of E1, hole 98 of web 18 that constitutes compensating piston 60 of first clutch E1.

The connecting means constituted by rivets 95 nevertheless do not impede oil circulation radially from inside to outside, intended in particular to lubricate friction linings 84 and 134 of clutches E1 and E2.

Indentations 96 of web 18 that constitutes compensating piston 60, like indentations 146 of compensating piston 120, are circumferentially discontinuous.

The number of indentations 96 and 146 corresponds to the number of rivets 95 used to implement the axial zero-clearance connection, for example is twelve.

As depicted in FIG. 2, thanks to indentations 96 an axial clearance exists between the rear radial face of compensating piston 60 constituted by web 18 and the front radial face of internal disc carrier 90, allowing radial circulation of oil to the multiple-disc assemblage of first clutch E1.

Advantageously, oil passages are thus configured to allow oil circulation radially outward at the level of the connecting means constituted by rivets 95.

The oil circulates, radially from inside to outside according to the arrows depicted in particular in FIG. 2, utilizing radial oil passages F that are delimited circumferentially by two consecutive indentations 96 of web 18 that constitutes compensating piston 60 of first clutch E1, or by two circumferentially consecutive indentations 146 of compensating piston 120 of second clutch E2.

The oil flow circulates radially outward on either side of the radial portions of the two-part hub 35 which are associated with first element 68 and with second element 72 that constitute said reaction means 70.

For first clutch E1, the oil flow then passes radially through the radial holes configured in tooth set 92 of internal disc carrier 90 and then circulates between friction discs 84 and flanges 86 of the multiple-disc assemblage of E1 before passing through the radial holes configured in tooth set 77 of external disc carrier 76.

For second clutch E2, the oil flow passes radially through the radial holes configured in tooth set 142 of internal disc carrier 140 and then circulates between friction disks 124 and flanges 136 of the multiple-disc assemblage of E2 before passing through the radial holes configured in tooth set 127 of external disc carrier 126.

When the connecting means are implemented by riveting, sealing of compensating chamber 58 of first clutch E1 is provided, around holes 98, by contact between a radially planar annular face that is constituted as a result of indentation 96 and surrounds hole 98.

Once riveting has been performed in order to axially connect the parts together, said annular face interacts with a region of the planar radial face surrounding hole 97 of internal disc carrier 90.

Sealing of compensating chamber 118 of second clutch E2 is provided, around holes 148, by contact between a radially planar annular face that is constituted as a result of indentation 146 and surrounds hole 148.

Once riveting has been performed in order to axially connect the parts together, said annular face interacts with a region of the planar radial face surrounding hole 147 of internal disc carrier 140.

After having circulated radially through first clutch E1 and second clutch E2, the oil ends up in the space enclosed radially between disc carriers 76, 126 and input shell 12 that is connected by rivets 25 to drive web 18.

Once a portion of the oil has, in particular, circulated through first clutch E1, it ends up in the space that is enclosed, axially at the front, radially between external disc carrier 76 and an inner face of axially oriented radially outer portion 18A, which is tilted.

The oil is then drained radially through holes 30A and 30B as indicated by the arrows in FIG. 2 and, advantageously following axially oriented radially outer portion 18A of drive web 18, which portion is tilted, through radial oil drainage passages P constituted by means of axial indentations 27 in rim 16.

Once a portion of the oil has, in particular, circulated through second clutch E2, it ends up in the space that is enclosed, axially at the rear, radially between external disc carrier 126 and an inner face of axially oriented radially outer portion 12A of input shell 12, which is tilted.

The oil is then drained radially, advantageously following axially oriented radially outer portion 12A, which is tilted, through radial oil drainage passages P constituted by means of indentations 27.

As a variant that is not depicted, axially oriented radially outer portion 12A of input shell 12 has radial holes similar to holes 30 of drive web 18.

Figure 5:
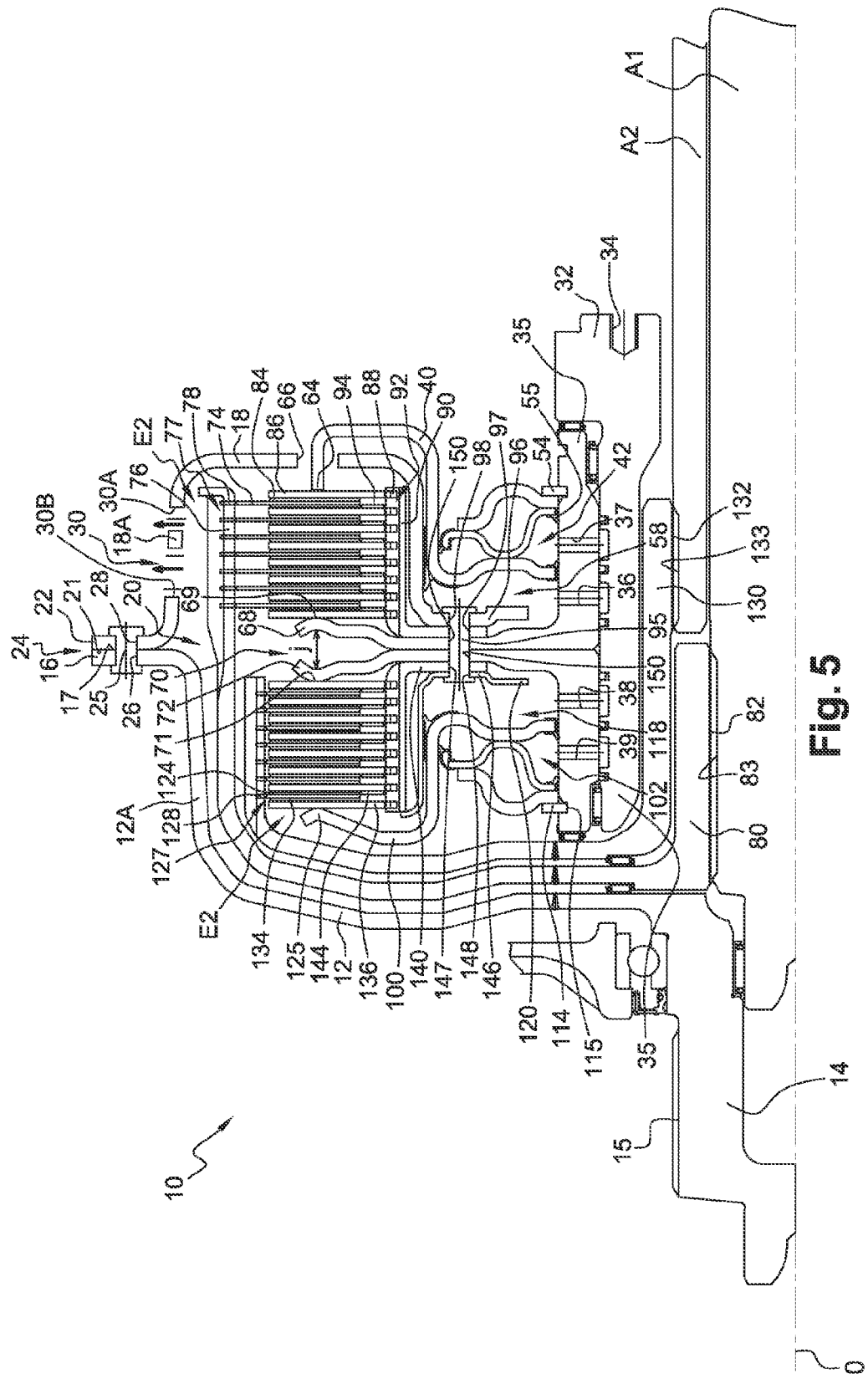
FIG. 5 is an axial half section view that depicts a transmission system having a double wet clutch mechanism and that illustrates a second embodiment of the invention in which the connecting means of the input shell and of the drive web are implemented by riveting, the rivets connecting radial tabs of the input shell and a circumferentially radial rim of the drive web with zero axial clearance and rotationally with zero angular clearance.
Figure 6:
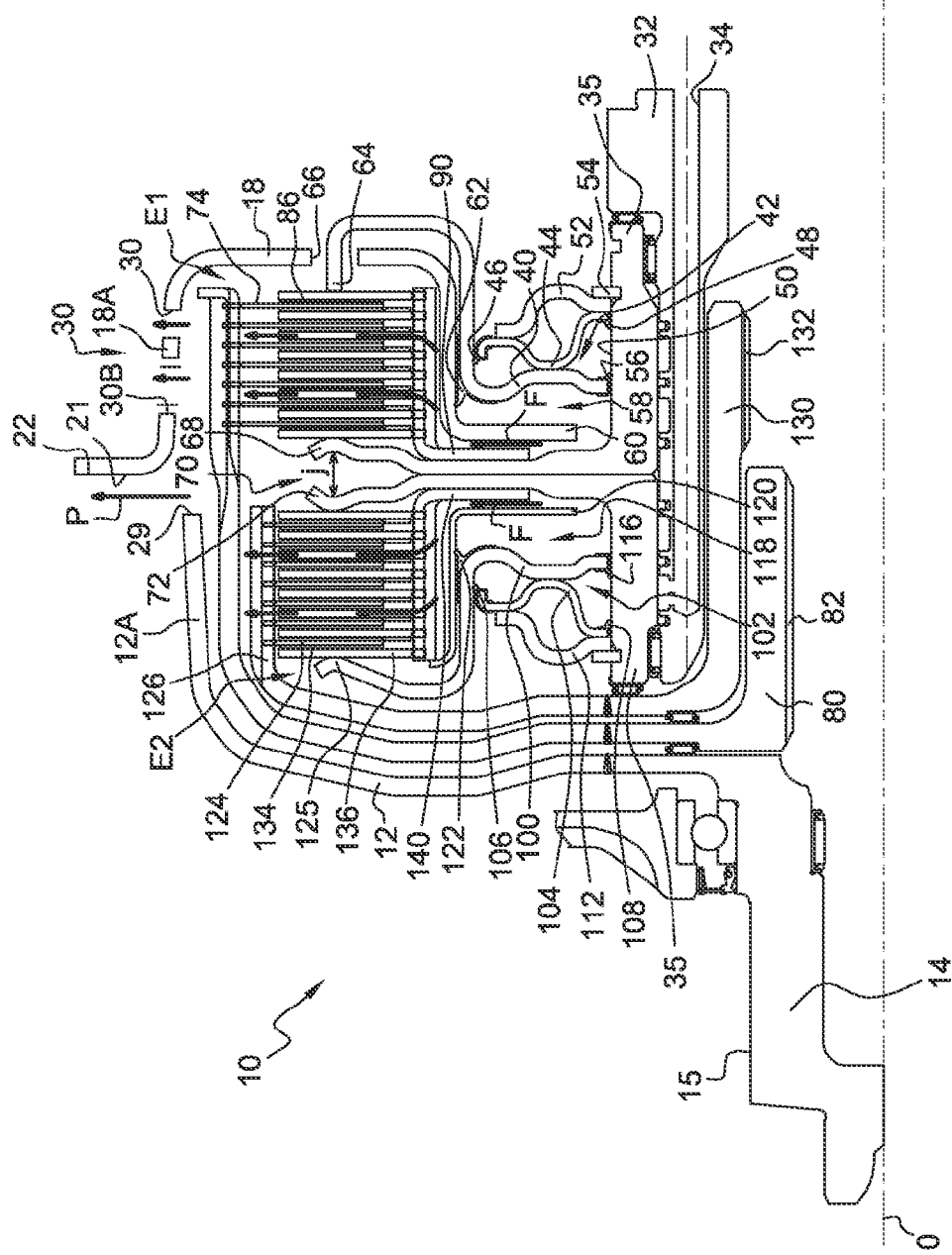
FIG. 6 is an axial half section view, shifted angularly with respect to that of FIG. 5, that depicts the transmission system according to the second embodiment and that illustrates in particular one of the radial oil circulation passages that exists between two consecutive tabs and is constituted by an axial clearance between an edge of the input shell and the radial face of the rim of the drive web axially opposite.
Figure 7:
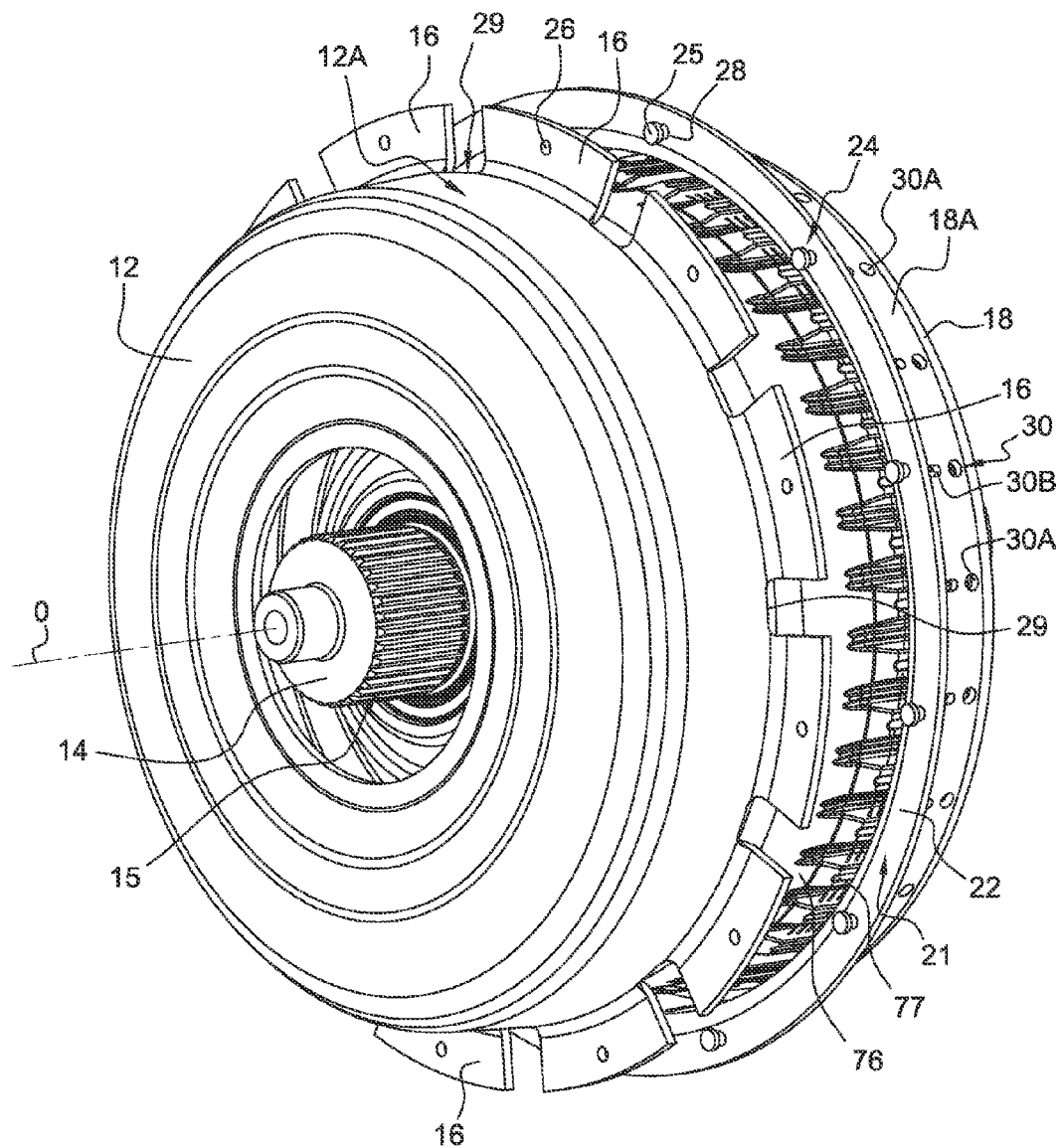
FIG. 7 is a perspective view that depicts the transmission system according to the second embodiment and that illustrates, by means of an axial exploded view, the radial tabs of the input shell and the circumferentially continuous rim of the drive web which are rotationally connected with zero angular clearance by riveting, and the oil drainage means having on the one hand said radial oil circulation passages produced by said axial clearance arranged with respect to the drive web between two circumferentially consecutive tabs of the input shell, and on the other hand radial holes implemented in the axially oriented radially outer portion of the drive web.

FIGS. 5 to 7 depict a second embodiment according to the invention of a transmission system 10 having a double wet clutch mechanism 20.

This second embodiment will be described below by comparison with the first embodiment, the same reference numbers designating identical parts or parts having similar functions.

The description of transmission system 10 according to the first embodiment which is illustrated by FIGS. 1 to 4, and very particularly that of double wet clutch mechanism 20, consequently applies to the second embodiment depicted in FIGS. 5 to 7.

In this second embodiment, input shell 12 and drive web 18 are rotationally connected, by connecting means 24 constituted by rivets 25, with zero angular clearance and with zero axial clearance.

Preferably said connecting means 24 are implemented by riveting; in variants that are not depicted, by welding or by crimping.

Input shell 12 has at least one radially oriented connecting portion that is rotationally connected by said rivets 25 to a radially oriented connecting portion of drive web 18.

Input shell 12 has a radially oriented connecting portion 16 that is circumferentially discontinuous and is constituted by radial tabs.

Drive web 18 has a radially oriented connecting portion 22 that is constituted by a circumferentially continuous rim.

As a variant that is not depicted, drive web 18 has a radially oriented connecting portion 22 that is constituted by radial tabs, like input shell 12 in this second embodiment.

As a variant that is not depicted, input shell 12 has a radially oriented connecting portion 16 that is constituted by a circumferentially continuous rim, and drive web 18 has a radially oriented connecting portion 22 that is circumferentially discontinuous and is constituted by radial tabs.

When at least one of the radially oriented connecting portions 16, 22 is circumferentially discontinuous, and when said connecting means 24 are implemented, alternatively to riveting, by a circumferentially discontinuous weld bean, a weld of this kind is then preferably an added-material weld. Alternatively, the weld can be of the resistance spot weld type.

Radial tabs 16 that constitute said at least one connecting portion of input shell 12 each have a radial face 17 that, by comparison with the first embodiment, is circumferentially discontinuous.

Rim 22 that constitutes said at least one connecting portion of drive web 18 has a radial face 21 that, as in the first embodiment, is circumferentially continuous.

Radial faces 17 of tabs 16 and face 21 of rim 22 are attached axially to one another in the regions in which said tabs 16 are axially connected to rim 22 by rivets 25 that constitute said connecting means 24.

Advantageously, and as in the first embodiment, system 10 has oil drainage means arranged in at least one radially outer portion of input shell 12 and/or in at least one radially outer portion of drive web 18, in order to allow oil to drain radially outward.

Preferably said oil drainage means are distributed circumferentially in a regular manner and/or are paired symmetrically with respect to axis O.

As depicted in FIGS. 5 to 7, said oil drainage means have at least radial holes 30 implemented in an axially oriented radially outer portion of drive web 18.

Advantageously, said oil drainage means have at least one radial oil drainage passage P configured circumferentially between the connecting portions of input shell 12 and of drive web 18, rotationally connected by rivets 85 that constitute said connecting means 24.

In this second embodiment, said at least one radial oil drainage passage P is not produced by means of an axial indentation.

Advantageously, said at least one radial oil drainage passage P is constituted by an axial clearance present between an edge 29 of input shell 12 and drive web 18.

Said axial clearance, which is circumferentially discontinuous, is located between all or some of the regions of said connecting portions 16, 22 of input shell 12 and of drive web 18 that are rotationally connected by connecting rivets 25, i.e. preferably between two consecutive radial tabs 16.

Advantageously, in accordance with this second embodiment said oil drainage means can have radial holes 30 implemented in axially oriented radially outer portion 12A of input shell 12.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

We claim:

1. A transmission system (10), comprising:
an input shell (17) that is around an axis (O) and rotationally connectable to a driving shaft, said input shell (12) comprising a first radially extending connecting portion (16);
a drive web (18) that is around the axis (O) and comprises a second radially extending connecting portion (22), said drive web (18) and said input shell (12) collectively delimiting an inner volume of said transmission system (10);
a double wet clutch mechanism (20) connected to said drive web (18), said double wet clutch mechanism (20) comprising a first multi-disc clutch (E1) and a second multi-disc clutch (E2) axially juxtaposed with respect to one another and controllable to selectively couple said driving shaft to a first driven shaft (A1) and to a second driven shaft (A2), respectively, said first and second multi-disc clutches (E1, E2) being received inside said inner volume;
a connector axially connecting said first and second radially extending connecting portions (16, 22) with zero angular clearance and zero axial clearance at said connector (24) in order to rotationally connect said input shell (12) to said double wet clutch mechanism (20) along a torque transfer path traveling directly through said drive web (18); and
at least one radial oil drainage passage (P) arranged in at least one radially outer portion of the input shell (12) and/or in at least one radially outer portion of the drive web (18) to allow oil drainage radially outward, the at least one radial oil drainage passage (P) configured circumferentially between the first radially extending connecting portion (16) of the input shell (12) and the second radially extending connecting portion (22) of the drive web (18) rotationally connected by said connector (24).

2. The system according to claim 1, wherein said connector (24) comprises an axially extending rivet.

3. The system according to claim 1, wherein said connector (24) comprises a weld.

4. The system according to claim 3, wherein said connector (24) comprises a circumferentially discontinuous weld bead.

5. The system according to claim 3, wherein said connector (24) comprises a spot resistance weld.

6. The system according to claim 1, wherein at least one of said first and second radially extending connecting portions (16, 22) is constituted by a circumferentially continuous rim.

7. The system according to claim 1, wherein at least one of said first and second radially extending connecting portions (16, 22) is constituted by circumferentially discontinuous radial tabs.

8. The system according to claim 1, wherein said first radially extending connecting portion (16) of the input shell (12) has a first radial face (17) and said second radially extending connecting portion (22) of the drive web (18) has a second radial face (21), said connector (24) axially connecting said first and second radial faces (17, 21) to one another.

9. The system according to claim 1, wherein said at least one radial oil drainage passage (P) comprises a plurality of radial oil drainage passages distributed circumferentially in a regular manner and/or are paired symmetrically with respect to the axis (O).

10. The system according to claim 1, further comprising oil drainage radial holes (30) in an axially oriented radially outer portion (18A) of the drive web (18) and/or in an axially oriented radially outer portion (12A) of the input shell (12).

11. The system according to claim 1, wherein said at least one radial oil drainage passage (P) is constituted by an axial indentation (27) in at least one unconnected region of said first radially extending connecting portion (16) of the input shell (12) and/or in at least one unconnected region of said second radially extending connecting portion (22) of the drive web (18).

12. The system according to claim 1, wherein said at least one radial oil drainage passage (P) is constituted by a circumferentially discontinuous axial clearance between an edge (29) of the input shell (12) and the drive web (18), said circumferentially discontinuous axial clearance being located between all or some of the regions of said first and second radially extending connecting portions (16, 22) of the input shell (12) and of the drive web (18) rotationally connected by said connector (24).

13. The system according to claim 1, wherein the input shell (12) has an axially oriented radially outer portion (12A) that is tilted with respect to the axial orientation in order to guide oil toward the at least one radial oil drainage passage (P), and/or the drive web (18) has an axially oriented radially outer portion (18A) that is tilted with respect to the axial orientation in order to guide oil toward the at least one radial oil drainage passage (P).

14. The system according to claim 1, wherein said system is configured for a motor vehicle.

15. A transmission system (10), comprising:
an input shell (12) that is around an axis (O) and rotationally connectable to a driving shaft, said input shell (12) comprising a first radially extending connecting portion (16) having a first radial face (17) and a first opposite radial face spaced apart from the first radial face (17) across a thickness of the input shell (12);
a drive web (18) comprising a second radially extending connecting portion (22) with a second radial face and a second opposite radial face spaced apart from the second radial face (21) across a thickness of the drive web (18);
a double wet clutch mechanism (20) connected to the drive web (18), the double wet clutch mechanism (20) comprising a first multi-disc clutch (E1) and a second multi-disc clutch (E2) and controllable to selectively couple said driving shaft to a first driven shaft (A1) and to a second driven shaft (A2), respectively;
a connector (24) established at an interface of said first and second radial faces (17, 21) to rotationally connect said first radial face (17) of said input shell (12) in direct contact with the second radial face (21) of said drive web (18) with zero angular clearance in order to rotationally connect said input shell (12) to said double wet clutch mechanism (20); and
at least one radial oil drainage passage (P) arranged in at least one radially outer portion of the input shell (12) and/or in at least one radially outer portion of the drive web (18) to allow oil drainage radially outward, the at least one radial oil drainage passage (P) configured circumferentially between the first radially extending connecting portion (16) of the input shell (12) and the second radially extending connecting portion (22) of the drive web (18) rotationally connected by said connector (24).

16. The system according to claim 1, wherein said connector (24) comprises a crimp.

\* \* \* \* \*